(12) United States Patent
Byun

(10) Patent No.: US 9,849,882 B2
(45) Date of Patent: Dec. 26, 2017

(54) VEHICLE CONTROL BASED ON CROWDSOURCING DATA

(71) Applicant: Jung H Byun, Fairfax, VA (US)

(72) Inventor: Jung H Byun, Fairfax, VA (US)

(*) Notice: Subject to any disclaimer, the term of this patent is extended or adjusted under 35 U.S.C. 154(b) by 0 days.

(21) Appl. No.: 14/798,273

(22) Filed: Jul. 13, 2015

(65) Prior Publication Data

US 2016/0229404 A1  Aug. 11, 2016

Related U.S. Application Data

(60) Provisional application No. 62/112,889, filed on Feb. 6, 2015.

(51) Int. Cl.
| | | |
|---|---|---|
| *H04W 84/20* | (2009.01) |
| *B60W 30/18* | (2012.01) |
| *B60W 10/04* | (2006.01) |
| *B60W 10/18* | (2012.01) |
| *B60W 10/20* | (2006.01) |
| *G01C 21/26* | (2006.01) |
| *G05D 1/00* | (2006.01) |
| *H04W 4/00* | (2009.01) |
| *H04W 4/04* | (2009.01) |
| *H04W 4/20* | (2009.01) |

(52) U.S. Cl.
CPC ............ *B60W 30/18* (2013.01); *B60W 10/04* (2013.01); *B60W 10/18* (2013.01); *B60W 10/20* (2013.01); *G01C 21/26* (2013.01); *G05D 1/0088* (2013.01); *H04W 4/00* (2013.01); *H04W 4/046* (2013.01); *H04W 4/206* (2013.01); *B60W 2400/00* (2013.01); *B60W 2540/04* (2013.01); *B60W 2710/18* (2013.01); *B60W 2710/207* (2013.01); *B60W 2720/10* (2013.01); *G05D 2201/0213* (2013.01)

(58) Field of Classification Search
USPC ........ 455/435; 342/357.52, 357.65; 340/902, 340/903, 993; 701/1, 117, 409, 532, 300, 701/451, 119, 447, 450, 519
See application file for complete search history.

(56) References Cited

U.S. PATENT DOCUMENTS

| | | | | |
|---|---|---|---|---|
| 6,111,539 A | * | 8/2000 | Mannings | G01C 21/34 342/357.31 |
| 7,430,218 B2 | * | 9/2008 | Lee | G08G 1/0104 370/464 |

(Continued)

OTHER PUBLICATIONS

International Search Report mailed Apr. 14, 2016 for PCT/US2016/016962.

(Continued)

*Primary Examiner* — Richard Goldman
(74) *Attorney, Agent, or Firm* — Studebaker & Brackett PC

(57) ABSTRACT

Aspects of the disclosure relate generally to a method for controlling a vehicle based on crowdsourcing data. According to the method, the vehicle transmits a route request to a server, receive navigation information in response to the route request, controls an operation of the vehicle based on the transmitted navigation information, collects vehicle driving data, during driving according to the transmitted navigation information, transmits the collected data to the server, receives generated crowdsourcing data, updates the transmitted navigation information based on the received crowdsourcing data, and controls the operation of the vehicle based on the updated navigation information.

18 Claims, 9 Drawing Sheets

(56) References Cited

U.S. PATENT DOCUMENTS

| | | | | |
|---|---|---|---|---|
| 8,232,889 B2* | 7/2012 | Radtchenko | H04W 84/18 | 340/686.1 |
| 8,279,763 B2* | 10/2012 | Rozum | G08G 1/096716 | 370/252 |
| 8,744,736 B2* | 6/2014 | Basnayake | G08G 1/0112 | 701/119 |
| 9,014,983 B1* | 4/2015 | Uy | G01W 1/02 | 244/30 |
| 2004/0015293 A1* | 1/2004 | Randazzo | G01C 21/00 | 701/409 |
| 2004/0230370 A1* | 11/2004 | Tzamaloukas | G01C 21/3492 | 701/400 |
| 2007/0150174 A1* | 6/2007 | Seymour | G01C 21/3617 | 701/532 |
| 2008/0103696 A1* | 5/2008 | Cheok | G01S 5/0284 | 701/300 |
| 2008/0162027 A1* | 7/2008 | Murphy | B60W 50/14 | 701/117 |
| 2009/0299562 A1* | 12/2009 | Sudou | G05D 1/0278 | 701/25 |
| 2012/0038489 A1* | 2/2012 | Goldshmidt | G08G 1/163 | 340/903 |
| 2012/0050101 A1* | 3/2012 | Whiteman | G01S 5/0027 | 342/357.31 |
| 2013/0013185 A1* | 1/2013 | Smitherman | G01C 11/025 | 701/409 |
| 2013/0190964 A1* | 7/2013 | Uehara | G01C 21/3691 | 701/25 |
| 2013/0226451 A1* | 8/2013 | O'Neill | G01C 21/206 | 701/450 |
| 2014/0005933 A1* | 1/2014 | Fong | G05D 1/0274 | 701/447 |
| 2014/0132767 A1* | 5/2014 | Sonnabend | G08G 1/144 | 348/148 |
| 2014/0156134 A1* | 6/2014 | Cullinane | B60W 30/00 | 701/23 |
| 2014/0195071 A1* | 7/2014 | Hunt | G07C 5/08 | 701/1 |
| 2014/0249734 A1* | 9/2014 | Gueziec | G08G 1/0112 | 701/117 |
| 2014/0277902 A1* | 9/2014 | Koch | G07C 5/008 | 701/29.1 |
| 2015/0127191 A1* | 5/2015 | Misra | G08G 1/0112 | 701/1 |
| 2015/0204676 A1* | 7/2015 | Zhang | G01C 21/206 | 701/410 |
| 2015/0211871 A1* | 7/2015 | Jeong | G01C 21/34 | 701/522 |
| 2015/0300828 A1* | 10/2015 | Tseng | G01C 21/32 | 701/532 |
| 2015/0334678 A1* | 11/2015 | MacGougan | G01S 19/22 | 701/451 |
| 2015/0345981 A1* | 12/2015 | Goldman-Shenhar | G01C 21/3629 | 701/533 |
| 2016/0178376 A1* | 6/2016 | Moore | G08G 1/14 | 701/532 |
| 2016/0178379 A1* | 6/2016 | Moraru | G01C 21/206 | 701/522 |
| 2016/0195400 A1* | 7/2016 | Young | G01C 21/206 | 701/409 |

* cited by examiner (a)

505 — Driver 1's data
0010110011011001111011111011001101101010

506 — Driver 2's data
0010111011111001000101011011001010101101

507 — Processed data for Driver 3
0010110011011001111001110011110001101010110110010101011101
                          ⎵⎵⎵⎵⎵⎵⎵⎵⎵⎵⎵⎵⎵⎵⎵
                          Overlaid Portion (b)

VEHICLE CONTROL BASED ON CROWDSOURCING DATA

RELATED APPLICATIONS

The following U.S. Patent Application is related to the present application and is hereby specifically incorporated by reference: Provisional Patent Application No. 62/112,889, entitled "Vehicle Operator Prediction and Control Platform," filed on Feb. 6, 2015.

DESCRIPTION

Background

Unless otherwise indicated herein, the materials described in this section are not prior art to the claims in this application and are not admitted to be prior art by inclusion in this section.

Modern vehicles often include navigational hardware or software to aid users when travelling from one location to another. A user can input a destination and the navigational hardware or software can present one or more routes from a start location to a destination location. Often route information will include the distance from the start location to the destination location. Sometimes the route information will include an estimate of the amount of time that it will take to travel from the current location to the destination location based on distance and speed. The user may select which route to take based on the distance or estimated time. Based on the user selection, the navigational hardware or software decides a route to the destination.

Meanwhile, various technologies can be utilized for the control of autonomous vehicles. Some systems involve placing a reference line for the vehicle to follow, while other systems may have a pre-defined route programmed into a vehicle. In some embodiments, an autonomous vehicle may be coupled to a track on the ground for guidance purposes. Other autonomous vehicles may be controlled by a computer and follow a route based on information stored in the computer.

An autonomous vehicle's navigational hardware or software may allow new route information to be programmed. A vehicle may be given a new route to follow based on maps or based on global position system (GPS) signals. Some autonomous vehicles may operate in non-autonomous mode where they can be driven similar to traditional human-controlled vehicles. When vehicles are driven in an autonomous mode, however, they may require more precise position information then when driven by a human operator.

SUMMARY

In some embodiments, a method for controlling a vehicle based on crowdsourcing data from vehicles includes at least: transmitting, by the vehicle, a request to a server, the request comprises a route to a destination; retrieving, by the server, navigation information for the request, the navigation information is autonomous navigation information; transmitting, by the server, the retrieved navigation information to the vehicle; controlling, by the vehicle, an operation of the vehicle based on the transmitted navigation information; collecting, by the vehicle, vehicle driving data, during driving according to the transmitted navigation information; transmitting, by the vehicle, the collected data to the server; generating, by the server, crowdsourcing data based on the collected data transmitted from a plurality of vehicles; receiving, by the vehicle, the generated crowdsourcing data from the server; updating, by the vehicle, the transmitted navigation information based on the received crowdsourcing data; and controlling, by the vehicle, the operation of the vehicle based on the updated navigation information.

In some embodiments, a vehicle includes at least: a communication unit configured to transmit a request for a route to a destination to a server, and receive navigation information retrieved according to the request from the server; a sensor configured to generate sending data; and a control unit configured to control an operation of the vehicle based on the received navigation information, collect, by the sensor, the sensing data during driving according to the received navigation information, generate driving data based on the collected sensor data, transmit the generated driving data to the server, receive crowdsourcing data from the server, update the received navigation information based on the received crowdsourcing data, and control the operation of the vehicle based on the updated navigation information.

In some embodiments, a server includes at least: a communication unit configured to receive a request for a route to a destination, from a vehicle; a storage unit configured to store route information; and a control unit configured to retrieve navigation information according to the received request, transmit the retrieved navigation information to the vehicle, receive collected data from a plurality of vehicles including the vehicle, combine the received data from each of the plurality of vehicles, extract a route-based data corresponding to the route of the vehicle, generate crowdsourcing data by using the extracted route-based data, and transmit the generated crowdsourcing data to the vehicle.

Details of one or more implementations are set forth in the accompanying drawings and the description below. Other features, aspects, and potential advantages will be apparent from the description and drawings, and from the claims.

DETAILED DESCRIPTION

The following disclosure provides many different embodiments, or examples, for implementing different features of the disclosed subject matter. Specific examples of components and arrangements are described below to simplify the present disclosure. These are examples and are not intended to be limiting.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments are also utilized, and other changes are also made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The methods, vehicle, and server disclosed herein generally relate to control of a vehicle based on crowdsourcing data from other vehicles. In some embodiments, the methods, vehicle, and server disclosed herein relate to control of a vehicle in autonomous mode.

Figure 1:
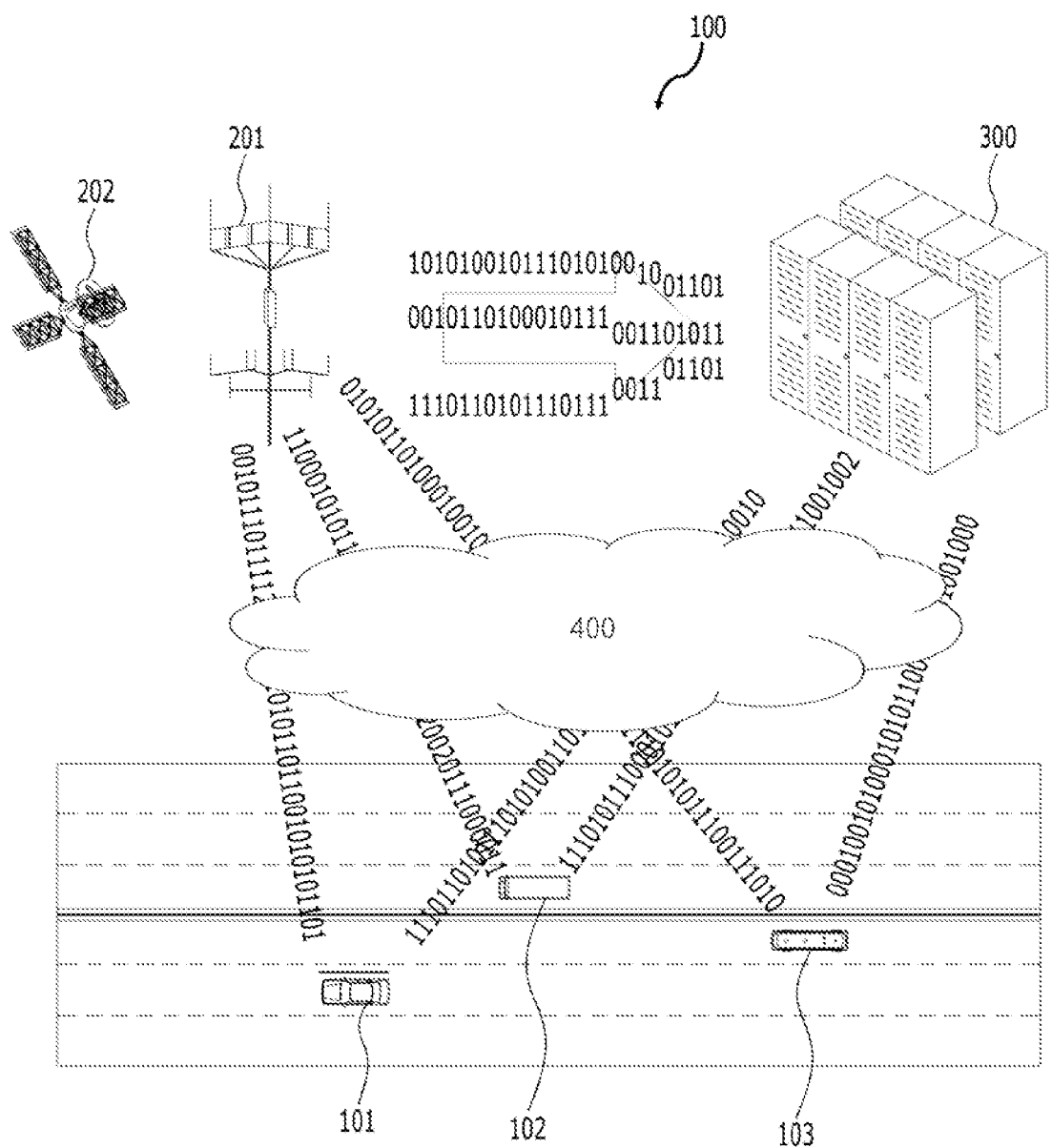
FIG. 1 is an environment for controlling a vehicle based on crowdsourcing data collected by vehicles, in accordance with one or more embodiments.

FIG. 1 is an environment for controlling a vehicle based on crowdsourcing data collected by vehicles, in accordance with one or more embodiments.

In an example embodiment, the crowdsourcing-based autonomous vehicle controlling environment 100 includes a plurality of vehicles 101, 102 and 103, a wireless node 201 or 202, and a server 300. The wireless node 201 or 202 includes a transmitter and receiver. The vehicles 101, 102 and 103 are configured to perform autonomous driving based on navigation information received from server 300, and the vehicles 101, 102 and 103 are equipped with a sensor which collects driving data, and equipped with a communication unit (not shown) configured to communicate with the wireless node 201 or 202, via wireless network. The wireless node 201 or 202 is configured to transmit data between the vehicles 101, 102 and 103 and the server 300. The server 300 is configured to analyze data transmitted from the vehicles 101, 102 and 103, via the wireless node 201 or 202 or directly from the vehicles 101, 102 and 103.

In some embodiments, each of the vehicles 101, 102 and 103 is equipped with a sensor configured to detect driving data. The driving data is based on the driver's actions or commands. For example, the driver's actions include at least one of timing of accelerating, braking or steering wheel rotating, and amount of accelerating, braking or steering wheel rotating. Navigation information is stored in and retrieved from a vehicle memory, in a database, or on the Internet. In some embodiments, new navigation information is received by server 300 wirelessly over a network such as a cellular network, an 802.11 network, or a Wireless Wide Area Network (WWAN), via the wireless node 201, 202 or directly from the vehicles. The vehicles transmit driving data to the server 300, via the wireless node 201 or 202, or directly. The driving data includes at least one of breaking data, acceleration data and steering data. In some embodiments, each of the vehicles 101, 102 and 103 communicates with the server 300, in accordance with a predetermined cycle of time or, when the vehicles detect an event during the driving to the destination. In some embodiments, each of the vehicles 101, 102 and 103 includes a computer system to provide data processing.

In some embodiments, the autonomous driving of the vehicles 101, 102 and 103 are performed by a Motor Driven Power Steering (MDPS) system. The Motor Driven Power Steering (MDPS) system is a motor driven steering system assisting steering power by using power from a motor without using hydraulic pressure. The MDPS system is disposed in vehicles. The MDPS is equipped with a decelerator. The decelerator includes a worm-shaft/worm wheel rotated by a motor to assist a steering force. The decelerator further includes a motor driven column apparatus having a tilt motor. The decelerator further a telescopic motor to implement tilt and telescopic movement. The MDPS motor is controlled by an MDPS Electronic Control Unit (ECU).

In some embodiments, a driver of the vehicle accesses the server that is configured to control the vehicle based on crowdsourcing data through a software application. In some embodiments, the software application is a website or a web application compatible with a hardware system discussed subsequently. In some embodiments, the software application is, in-part, configured by a hardware system that is embedded in the vehicle. Though the present disclosure is written with reference to a device embedded in a vehicle, it should be understood that any computing device, in some embodiments, is employed to provide the various embodiments disclosed herein.

In some embodiments, the vehicles measure the driver's actions made by drivers of the vehicles, and store such actions. Such actions are interpreted to predict vehicle operator behavior in one or more driving situations. The aforementioned predictions are used to create semi-autonomous or autonomous control of the vehicles. In addition, the actions of drivers of the multiple vehicles are combined to provide a wider range of application.

In some embodiments, route data is collected from other vehicles and assists a vehicle to drive autonomously. A hardware system (e.g., computing device 1100 shown in FIG. 7) is configured to store steering, acceleration, braking data in a memory storage of the hardware system, and then, the stored data is employed to drive vehicle autonomously. Moreover, embodiments comprise embedded software logic configured to override an autonomous driving system. Overrides are triggered if a data flag is raised by a connected sensor, for safety and instantly re-synchronizes route data to the driving system.

The detailed configuration of the vehicles 101, 102, and 103 according to some embodiments will be described below with reference to below figures. In some embodiments, the wireless node 201 or 202 is at least one of a satellite, terrestrial repeater, Global Positioning System (GPS) signal repeater, and cellular signal repeater. The wireless node communicates with the server 300 or the vehicles, in accordance with a predetermined cycle or, when the wireless node receives a predetermined event signal from at least one of the vehicles. For example, the predetermined event signal includes a signal of departing of a vehicle and a signal of arriving of a vehicle.

Figure 2:
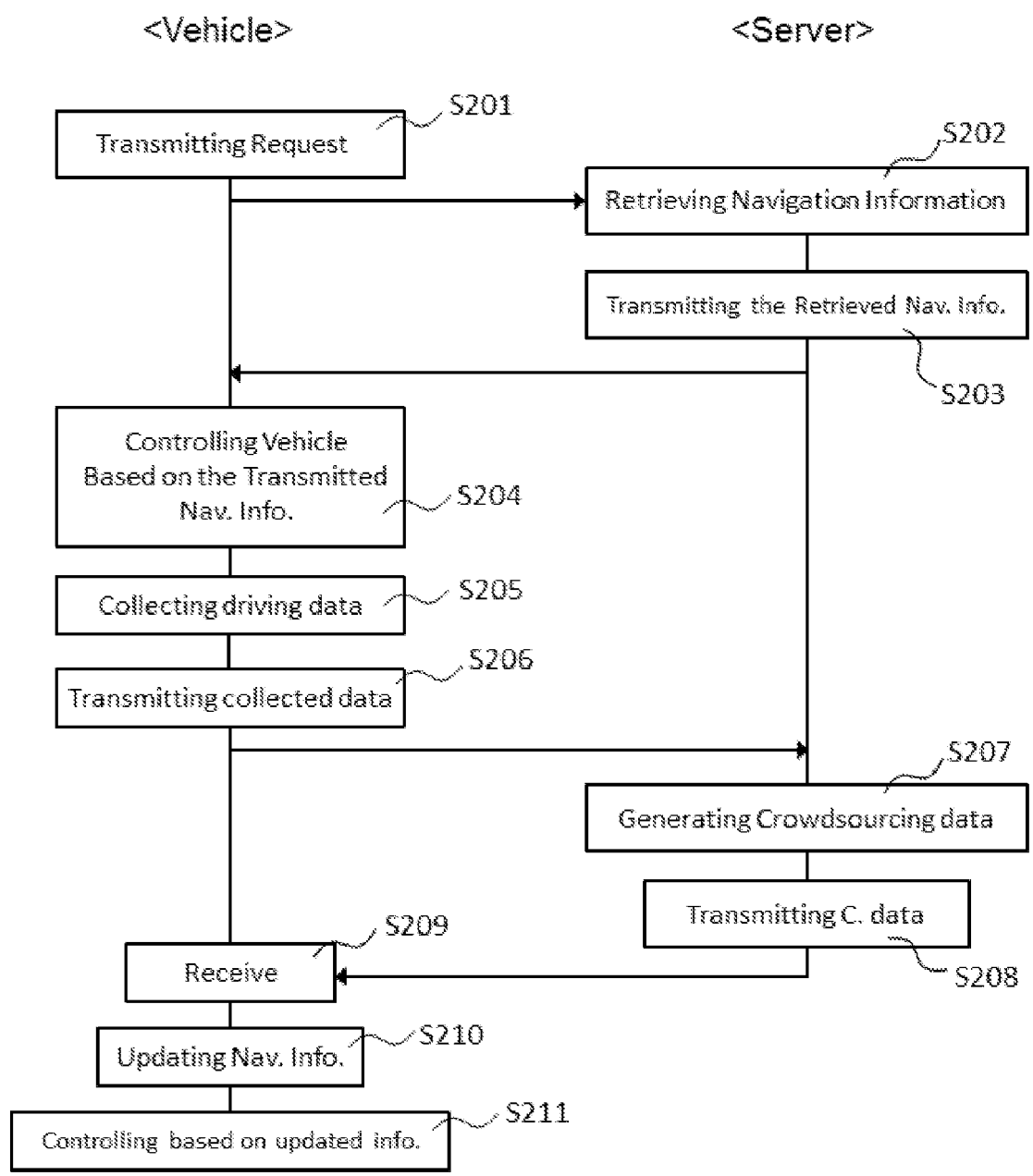
FIG. 2 is a flow diagram of an embodiment of a process for controlling a vehicle based on crowdsourcing data from vehicles, in accordance with one or more embodiments.

In some embodiments, the server 300 is a cloud computing service. The server 300 performs aspects of computing such as, in some embodiments, data analysis. In some embodiments, the server 300 is centralized. In some embodiments, vehicles transmit the driving data to server 300 (e.g., navigation server) over network 400 (e.g., the internet), via a wireless node. In some embodiments, the vehicles 101, 102, and 103 connect to the network 400 through cellular (or Wi-Fi) wireless node (or wireless access point) 201 or 202. In some implementations, the driving data collected by vehicles 101, 102 and 103 is used to generate crowdsourcing data to be used for controlling the vehicles. In some embodiments, the server 300 collects driving data from a plurality of vehicles, correlates the traffic information, route condition information. The driving data is collected and organized based on location and time. The server 300 also generates the crowdsourcing data based on the collected driving data. FIG. 2 is a flow diagram of an embodiment of a method for controlling a vehicle based on crowdsourcing data from vehicles, in accordance with one or more embodiments.

Figure 3:
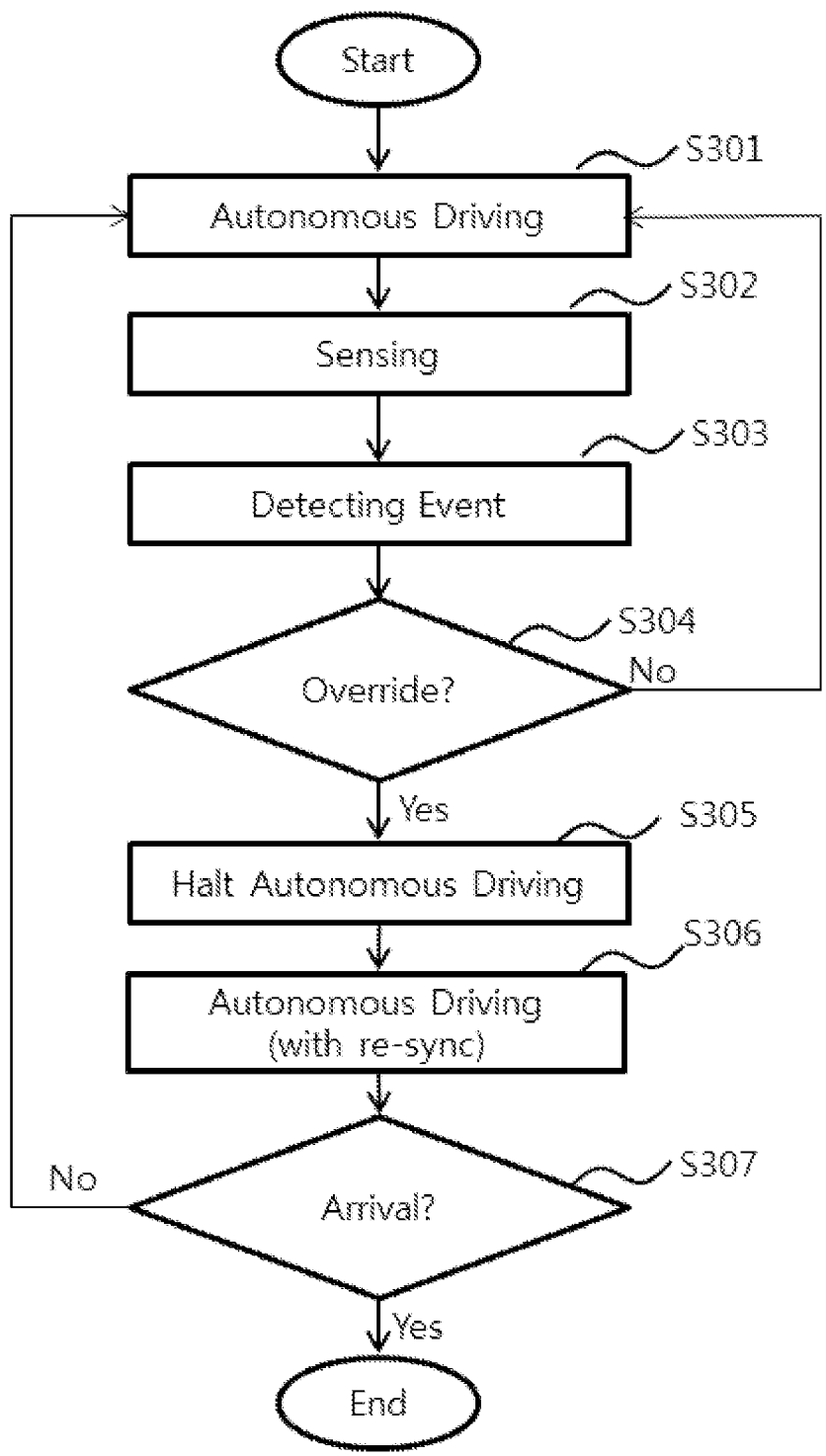
FIG. 3 is a flow diagram of another embodiment of a process for controlling a vehicle based on crowdsourcing data from vehicles, in accordance with one or more embodiments.

At operation S201, a vehicle (e.g., vehicle 101, 102, or 103 shown in FIG. 1) transmits a request for a route to a destination, to a server (e.g., server 300 shown in FIG. 3). The server receives the request from the vehicle. In some embodiments, the request is input by a driver of the vehicle. The vehicle receives an input from the driver for the destination. The vehicle is configured to provide an interface for a driver by way of a data input device. In some embodiments, the interface is a touch screen. In some embodiments, the request is automatically generated by the vehicle. The vehicle determines the destination based on a travel log stored in the vehicle. Meanwhile, the vehicle is connected with the server via at least one of a cellular network, a Wi-Fi network and a satellite network. The request is transmitted via at least one of the cellular network, the Wi-Fi network and the satellite network. In some embodiments, the request is transmitted via a wireless node, or directly transmitted, to the server.

At operation S202, the server retrieves navigation information that includes the requested route. The navigation information is autonomous navigation information which includes vehicle controlling information. In some embodiments, the navigation information is stored in the server, or generated when the route request is transmitted from the vehicle. In some embodiments, the navigation information includes controlling information for steering wheel rotation, accelerating, and breaking.

At operation S203, the server transmits the retrieved navigation information, to the vehicle. The vehicle receives the retrieved navigation information from the server. In some embodiments, the retrieved navigation information is transmitted via at least one of the cellular network, the Wi-Fi network and the satellite network. In some embodiments, the retrieved navigation information is transmitted via a wireless node, or directly transmitted, to the vehicle.

At operation S204, the operation of the vehicle is configured to be controlled based on the transmitted navigation information. In some embodiments, based on the transmitted navigation system, a motor driven power steering (MDPS) in which an electric motor which does not use hydraulic pressure is used or electro-hydraulic power steering (EHPS) in which an electric pump which is actuated by a motor rather than by the driving power of the engine is used for controlling the vehicle. In some embodiments, the MDPS and the EHPS are combined. In some embodiments, the MDPS and the EHPS perform complementary functions and auxiliary steering power is provided at an emergency steering failure in order to guarantee stability. In this example, the vehicle includes the MDPS which assists steering power using the torque of a main motor and the EHPS which assists the steering power using hydraulic pressure that is generated by actuation of a hydraulic pump. The MDPS is used as a main steering device, and the EHPS is used as an auxiliary steering device in order to assist insufficient steering power during emergency malfunctioning of the motor or in heavy duty vehicles. For autonomous controlling motors of the MDPS and the EHPS are controlled by an Electronic Control Unit (ECU). In this example, controlling is performed based on controlling information included in the navigation information. An acceleration, and braking of the vehicle are also controlled by the ECU, with reference to the controlling information included in the navigation information. The detailed configuration of the vehicle to be controlled by the navigation information, according to some embodiments, is described in FIG. 7.

At operation S205, while driving, the vehicle collects data regarding the vehicle driving operation, according to the transmitted navigation information. The data regarding vehicle driving operation includes driving data. In some embodiments, the data of driver's action includes information on at least one of a steering rotation, accelerating and breaking. In some embodiments, the vehicle collects the data, during driving to the destination, in accordance with a predetermined cycle. In other embodiments, the vehicle collects the data, during driving to the destination when the vehicle detects an event during the driving to the destination. The event is detected based on data defining an event to be detected and based on sensing data.

In some embodiments, the vehicle generates sensing data by using a plurality of sensors equipped in the vehicle. In some embodiments, the sensors include at least some of a distance sensor, infra-red sensor, a pressure sensor, a speed sensor, a motion sensor, a light sensor, a proximity sensor, a global navigation satellite system (GNSS) (e.g., GPS receiver), a temperature sensor, a biometric sensor, or other sensing device, to facilitate related functionalities. The vehicle collects the generated sensing data, and generates the collected data based on the collected sensing data.

In some embodiments, the plurality of sensors transmits the sensing data to the driving control unit via a wireless network or wired network. A controller area network (CAN), a local area network (LAN), or a serial network is used for the transmission of the sensing data.

In some embodiments, at least one of the plurality of sensors detects a traffic light during driving of the vehicle, and a stop of the vehicle at a red right of the detected traffic light. The vehicle uses the detected traffic light information for controlling a speed of the vehicle. In some embodiments, the server transmits stop sign/stop light attribute information to the vehicle. In some embodiments, the vehicle receives stop sign/stop light attribute information for a geographic area as a navigation information from the server and the server transmits the stop sign/stop light attribute information to the vehicle for autonomous controlling.

At operation S206, the vehicle transmits the collected data to the server. The server receives the collected data from the vehicle. In some embodiments, the collected data is transmitted via at least one of the cellular network, the Wi-Fi network and the satellite network. In some embodiments, the collected data is transmitted via a wireless node, or directly transmitted, to the server. In some embodiments, the vehicle transmits the collected data in accordance with a predetermined cycle. In other embodiments, the vehicle transmits the collected data when the vehicle detects an event during the driving to the destination. The event is detected based on data defining an event to be detected and based on sensing data.

At operation S207, the server generates crowdsourcing data based on the collected data transmitted from a plurality of vehicles. Before generating the crowdsourcing data, the server receives the collected data from the vehicles. The server generates crowdsourcing data by using the received data. In some embodiments, the crowdsourcing data in generated by overlapping the collected data for overlapped route in the data from the vehicles. The detailed description of the overlapped information, according to some embodiments, will be described below with reference to FIG. 3.

At operation S208, the server updates stored navigation information based on the crowdsourcing data, and transmits the updated navigation information to the vehicle. In some embodiments, the server updates and transmits the navigation information when the crowdsourcing data is accumulated more than a threshold amount. At operation S209, the vehicle receives the crowdsourcing data from the server. In some embodiments, the data is transmitted via at least one of the cellular network, the Wi-Fi network and the satellite network. In some embodiments, the data is transmitted via a wireless node, or directly transmitted, to the vehicle.

In some embodiments, the server transmits the updated navigation information to the vehicle, and the vehicle receives the updated navigation information from the server. In some embodiments, the server processes the updated navigation information (e.g., filtering, noise cancelling, smoothing, or vectoring), and then transmits the processed navigation information to the vehicle.

At operation S210, the vehicle updates the navigation information based on the received external data. The vehicle combines the received crowdsourcing data and the collected data, and updates the navigation information based on the combined data. In some embodiments, the update is performed in accordance with a predetermined cycle.

At operation S211, the vehicle controls the operation of the vehicle based on the updated navigation information. During the driving based on the navigation information, when the vehicle detects a preset unusual event, the vehicle changes a driving mode of the vehicle to a driver-control mode. The preset unusual event, for example, includes an event that is not registered in the vehicle. The preset unusual event is detected based on data defining an event to be detected and based on sensing data. The controlling of the vehicle includes at least one of a speed controlling of the vehicle and a steering wheel angle controlling of the vehicle.

FIG. 3 is a flow diagram of another embodiment of a method 300 for overriding a vehicle based on crowdsourcing data from vehicles, in accordance with one or more embodiments.

Method shown in FIG. 3 is performed during autonomous vehicle-driving. In some embodiments, in operation S204 or in operation S211 of FIG. 2, the ECU of the vehicle (e.g., vehicle 101, 102, or 103 shown in FIG. 1) is configured to override the autonomous vehicle-driving based on sensing data in accordance with the method shown in FIG. 3.

In operation S301, autonomous driving is performed. In the autonomous driving, a vehicle (e.g., vehicle 101, 102, or 103 shown in FIG. 1) is controlled based on crowdsourcing data, sensing data and/or navigation information, as described in FIG. 2. In some embodiments, in the autonomous driving, the vehicle's steering wheel, accelerator, and break are autonomously controlled.

At operation S302, the vehicle senses a surrounding area of the vehicle, during driving of the vehicle. In some embodiments, the vehicle generates sensing data regarding the surrounding area of the vehicle, by using a plurality of sensors equipped in the vehicle. The sensors include at least some of a distance sensor, infra-red sensor, pressure sensor, and speed sensor.

At operation S303, the vehicle detects an event based on sensing data. The event includes at least one of detecting obstacle in a route, impacting from the outside vehicle, impacting from the inside vehicle, vibrating of the vehicle, and waving of the vehicle. The event is detected based on a matching result between event data and sensing data. The data defining the event is stored in the vehicle or the sensor. In some embodiments, the vehicle detects the event when an amount of the sensing data of the event is greater than the predetermined threshold amount.

At operation S304, the vehicle checks whether the event is an event to override the autonomous driving of the vehicle. In some embodiments, information regarding the event to override the autonomous driving of the vehicle is stored in the vehicle, and the vehicle performs the checking by comparing the stored information with the sensing data. In some embodiments, the vehicle determines whether to override the autonomous driving when an amount of the sensing data of the event is greater than the predetermined threshold amount. In some embodiments, the vehicle determines whether to override the autonomous driving when a duration of sensing of the event is longer than the predetermined threshold duration. If the vehicle determines to override the autonomous driving of the vehicle, the operation proceeds to operation S305. If the vehicle determines to not override the autonomous driving of the vehicle, the operation proceeds to operation S301.

If the vehicle determines to override the autonomous driving of the vehicle, at operation S305, the vehicle halts the autonomous driving. In some embodiments, the vehicle outputs a notification to a driver of the vehicle before halting the autonomous driving. In some embodiments, after the halting operation, the vehicle performs a predetermined evasive action based on the navigation information. In some embodiments, the predetermined evasive action includes at least one of breaking, accelerating, and turning.

After the performing the predetermined evasive action, the vehicle, at operation S306, returns to the autonomous driving. In some embodiments, the autonomous driving is re-synchronized with reference to location data of the vehicle and navigation information. Meanwhile, when the vehicle determines that the detected event in the operation S304 is not an event configured to override the autonomous driving of the vehicle, the vehicle keeps performing the autonomous driving S301.

At operation S307, the vehicle detects whether the vehicle arrives at a destination. The vehicle uses the navigation information and the current location of the vehicle for operation S307. If the vehicle determines arrival, the autonomous driving is ended. If the vehicle determines that arrival is not detected, the vehicle keeps performing the autonomous driving S301. In some embodiments, if the vehicle detects that a distance between the current location of the vehicle and the destination is less than a threshold distance, the vehicle outputs a notification. The notification includes at least one of message displaying, alarm sounding, vibrating, or alike which notify some information to a driver of the vehicle.

Figure 4:
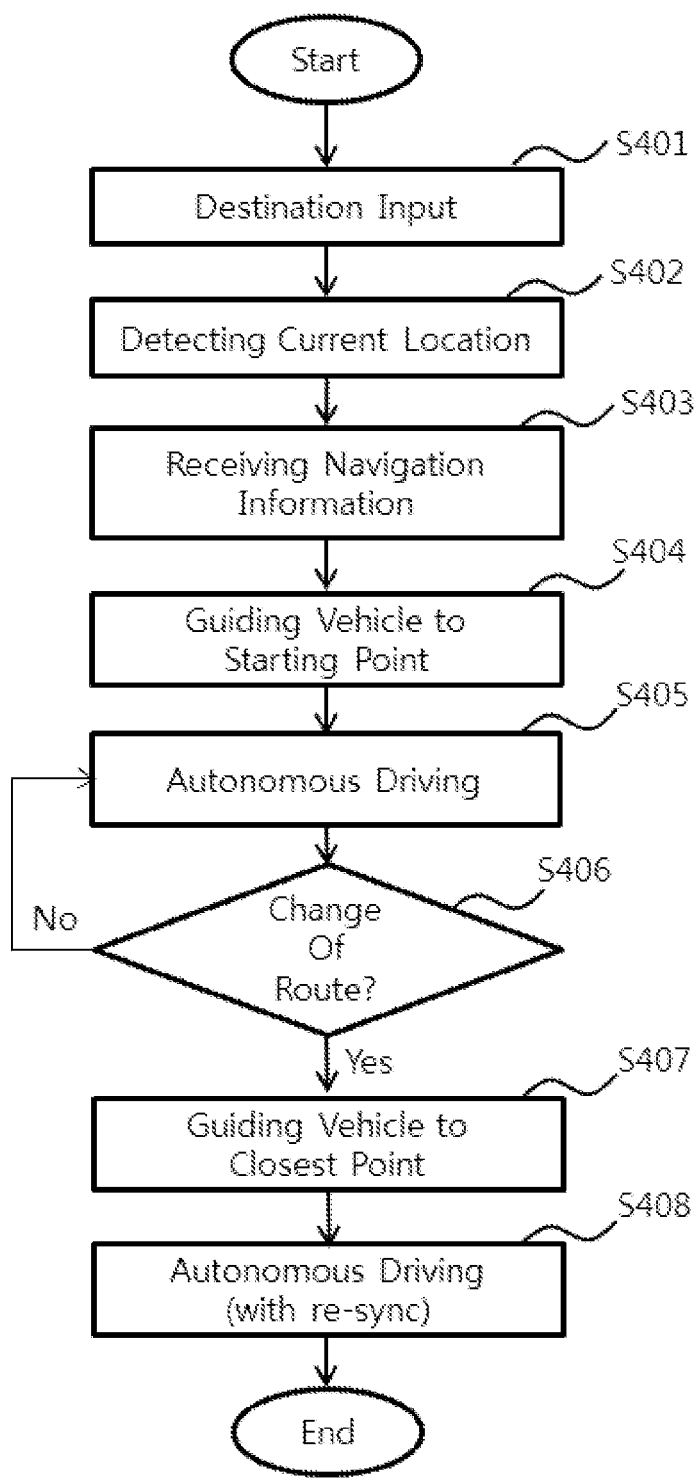
FIG. 4 is a flow diagram of another embodiment of a process for controlling a vehicle based on crowdsourcing data from vehicles, in accordance with one or more embodiments.

FIG. 4 is a flow diagram of another embodiment of a method 400 for controlling a vehicle based on crowdsourcing data from vehicles, in accordance with one or more embodiments.

In some embodiments, at the vehicle, before performing the autonomous vehicle-driving, in some embodiments, between operation S201 and operation S204 of FIG. 2, the ECU of the vehicle performs pre-operation for the autonomous driving. The operations of the pre-operation are described as below.

At operation S401, a vehicle receives a destination from a driver of the vehicle. For another example, the request is automatically generated by the vehicle. The vehicle determines the destination based on a travel log stored in the vehicle.

At operation S402, the vehicle detect a current location. In some implementations, the vehicle includes sensors, software and/or hardware for determining or tracking the location of the vehicle. In some embodiments, the vehicle includes a GNSS receiver for determining the location of the vehicle. The vehicle receives satellite signals from one or more GNSS satellites 106 and determine the location of the vehicle based on the satellite signals according to known methods. The vehicle include cellular and/or Wi-Fi transceivers for receiving and transmitting cellular and/or Wi-Fi signals. The cellular and/or Wi-Fi signals can be used to determine a location for the vehicle based on known locations for the cellular or Wi-Fi wireless nodes that are transmitting the cellular or Wi-Fi signals. In some embodiments, the vehicle uses triangulation or location averaging to determine the location of the vehicle based on the cellular and/or Wi-Fi signals.

At operation S403, the vehicle receives the navigation information from the server. The navigation information includes data for autonomous controlling the vehicle. In some embodiments, the data is crowdsourcing data for controlling the vehicle. In some embodiments, the navigation information is transmitted via at least one of the cellular network, the Wi-Fi network and the satellite network. In some embodiments, the navigation information is transmitted via a wireless node, or directly transmitted, to the vehicle.

At operation S404, the vehicle, when an amount of the crowdsourcing data related to the detected current location is less than a threshold amount, the ECU navigates or guides the vehicle to a different location associated with an amount of crowdsourcing data that is greater than the threshold amount. The different location is determined as a starting point. In some embodiments, the different location is the closest location from the current location of the vehicle, among the locations which have over-threshold amount crowdsourcing data.

In some embodiments, the server transmits information to the vehicle, such as, in some embodiments, the closest location for which the database has navigation information or crowdsourcing data. In this embodiment, the vehicle then displays to the driver the closest point and the driver then manually operates the vehicle in order to travel to the displayed location. In this embodiment, once the server or vehicle detects that the vehicle is in a location for which it has adequate data or adequate amount data, it performs some autonomous control of the vehicle.

At operation S405, the vehicle is controlled based on the navigation information, as described in the operation S204 of FIG. 2. In some embodiments, the vehicle's steering wheel, accelerator, and break are autonomously controlled for autonomous driving of the vehicle.

At operation S406, the vehicle determines if a change of route occurred. In some embodiments, the vehicle detects the change of the route when the vehicle drives on a route other than the route determined by the navigation information.

At operation S407, when the vehicle detects the route change, the ECU navigates or guides the vehicle to a next location which is the closest location and is on the determined route. And then, at operation S407, the vehicle keeps performing autonomous driving. In some embodiments, the autonomous driving is re-synchronized with reference to location data of the vehicle and navigation information.

Meanwhile, if the vehicle does not detect the change of route, the ECU, at S405, keeps performing autonomous driving.

In some embodiments, when a distance between the detected current location and a location of which an amount of the crowdsourcing data is less than a threshold amount, is less than a threshold distance, the vehicle outputs a notification. The notification includes at least one of sound notification, vibration notification, text notification, and image notification.

Figure 5:
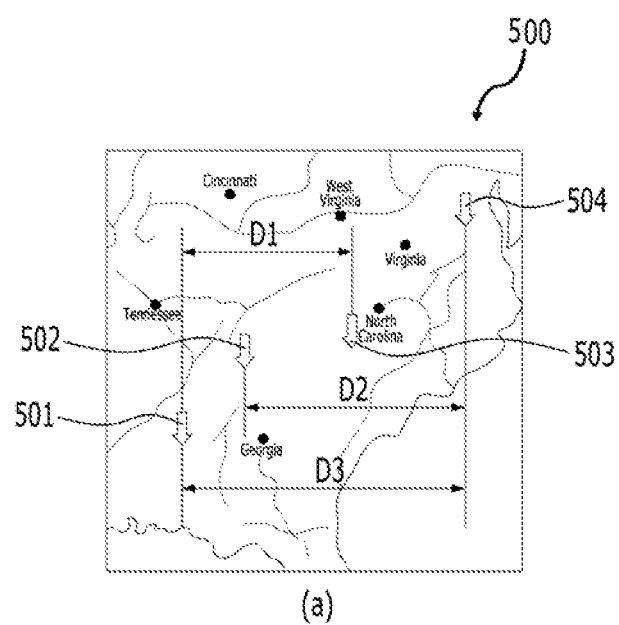
FIG. 5 is a schematic illustrating a conceptual partial view of overlapping crowdsourcing data, in accordance with one or more embodiments.

FIG. 5 is a schematic illustrating a conceptual partial view of overlapping crowdsourcing data, in accordance with one or more embodiments.

In some embodiments, a vehicle or a server generates navigation information by overlapping a plurality of crowdsourcing data. In some embodiments, the server receives first crowdsourcing data from a first vehicle, and receives second crowdsourcing data from a second vehicle. The server generates the navigation information by overlapping the first crowdsourcing data and the second crowdsourcing data. The server sends the generated navigation information to vehicles for autonomous controlling. In some embodiments, the vehicle performs corresponding operations to the above of the server, to generate the navigation information.

In some embodiments, the server determines an overlapped section which is a part of the route to the destination and is included in each of the driving sections of the first crowdsourcing data and the driving section of the second crowdsourcing data. In this embodiment, the server then extracts third crowdsourcing data regarding the overlapped section, from the first crowdsourcing data, and extracts fourth crowdsourcing data regarding the overlapped section, from the second crowdsourcing data. The server generates the navigation information by combining the third and fourth crowdsourcing data.

The exemplary overlapping is described in FIGS. 5(a) and 5(b). As shown in FIG. 5(a), a first driver drives a route D1, between 501 and 503, a second driver drives a route D2, between 502 and 504, and a third driver drives a route D3, between 501 and 504. The route D3 is covered by the route D1 and the route D2, and the route between 502 and 503 is overlapped.

As shown in FIG. 5(b), a first vehicle of the first driver collects driving data 505 for the route D1, and a second vehicle of the second driver collects driving data 506 for the route D2. Data (e.g. speeds, distances, vehicle operator actions, etc.) is collected by sensors embedded in the vehicles. Based on the driving data for the route D1 and the driving data for the route D2, navigation information 507 for route D3 is generated.

Figure 6:
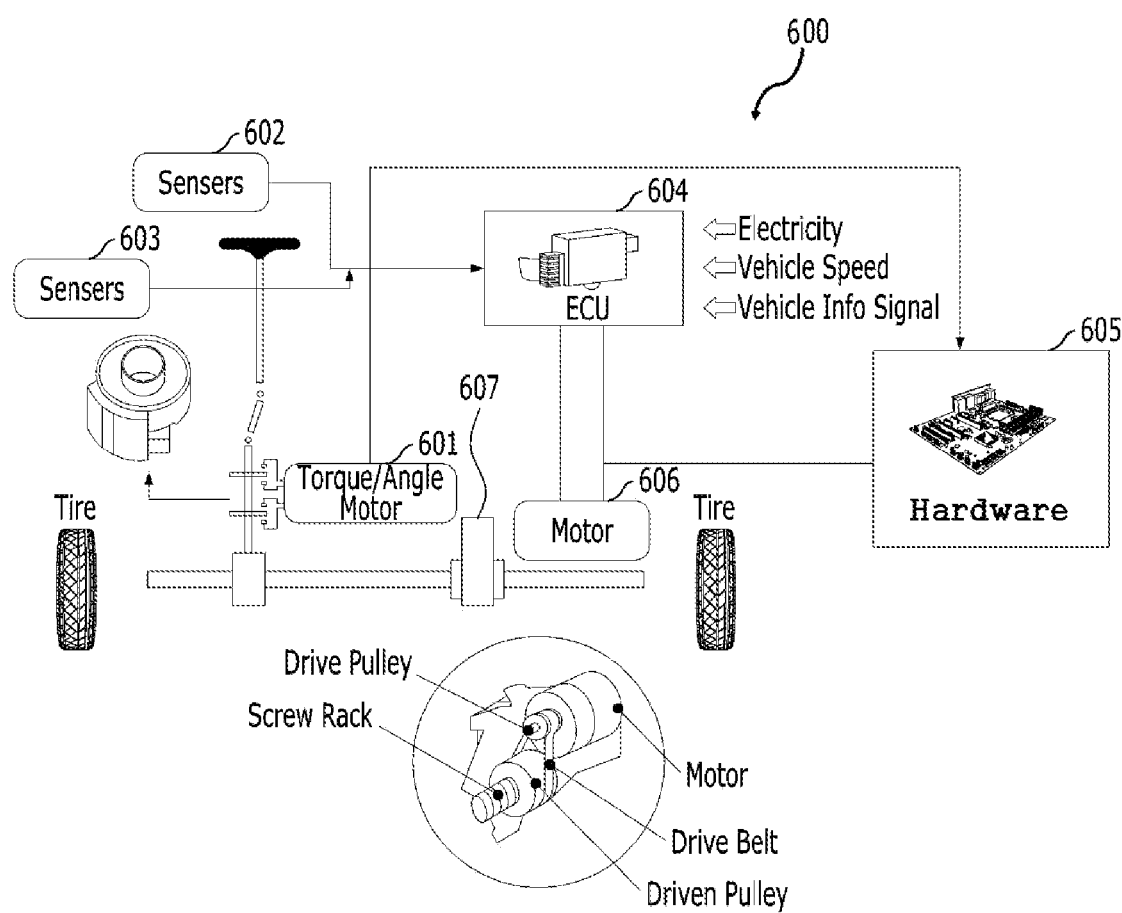
FIG. 6 is a block diagram illustrating an embodiment of a vehicle, in accordance with one or more embodiments.

FIG. 6 is a block diagram illustrating an embodiment of a vehicle, in accordance with one or more embodiments.

In some embodiments, a hardware system includes one or more sensors 602 and 603. The sensors 602 and 603 include sensors for receiving operator input. In some embodiments, sensors include one or more sensors for measuring steering torque and rotation, and gas pedal and brake pedal depression. In some embodiments, the vehicle further includes sensors 602 for detecting surrounding circumstances. Sensors 602 include cameras for detecting position relative to the road, traffic signs and signals, and obstacles in the road as well as velocity, acceleration and distance measuring devices. In some embodiments, sensors 603 include detecting surrounding sensors include, location determining devices, global positioning systems and triangulation systems.

At least one of sensors 602 and 603 interfaces with an electronic control unit (hereafter, ECU; 604). The ECU includes a computing device. Further, the ECU 604 includes volatile and non-volatile memory devices, such as, in some embodiments, RAM, ROM, flash memory, one or more hard drives and removable memory, and one or more devices for wirelessly transmitting data. The ECU 604 controls the motor 606 of the vehicle. The exemplary configuration of the ECU is described in FIG. 7.

In some embodiments, hardware 605 utilizes software for storing and transmitting the data. In some embodiments, the software incorporates methods for embedding metadata and transferring it wirelessly to a database.

The ECU 604 interfaces with the controls of the vehicle. In some embodiments, controls include motors, servos, pistons and computer controls that operate the speed and direction of the vehicle. Further controls operate auxiliary mechanisms, such as, in some embodiments, blinkers or horns to alert other vehicle operators.

In some embodiments, the vehicle further provide an interface for a driver of the vehicle by way of a data input device, such as, a touch screen. The driver, in some embodiments, select a destination on a data input device. The interface also displays relevant information to the vehicle operator, such as, in some embodiments, a map.

Data is acquired by sensors 602 and 603, during some or all of the vehicle operation. Data is stored in local memory or external memory embedded in hardware 605. Some or all of the acquired data is uploaded to the database in hardware 605. The database analyzes the data or embed the data as metadata. In some embodiments, the database is embedded in the server (e.g., server 300 shown in FIG. 1) which provides navigation information for the vehicle.

In some embodiments, recirculating ball 607 transmits power generated by the motor 606 to a worm gear of the vehicle for rotating the worm gear. The recirculating ball is a steering mechanism in older automobiles, off-road vehicles, and some trucks. By using the recirculating ball, vehicles use rack and pinion steering. The recirculating ball steering mechanism contains a worm gear inside a block with a threaded hole in it; this block has gear teeth cut into the outside to engage the sector shaft (also called a sector gear) which moves the Pitman arm. The steering wheel connects to a shaft, which rotates the worm gear inside of the block. Instead of twisting further into the block, the worm gear is fixed so that when it spins, it moves the block, which transmits the motion through the gear to the pitman arm, causing the road wheels to turn.

Figure 7:
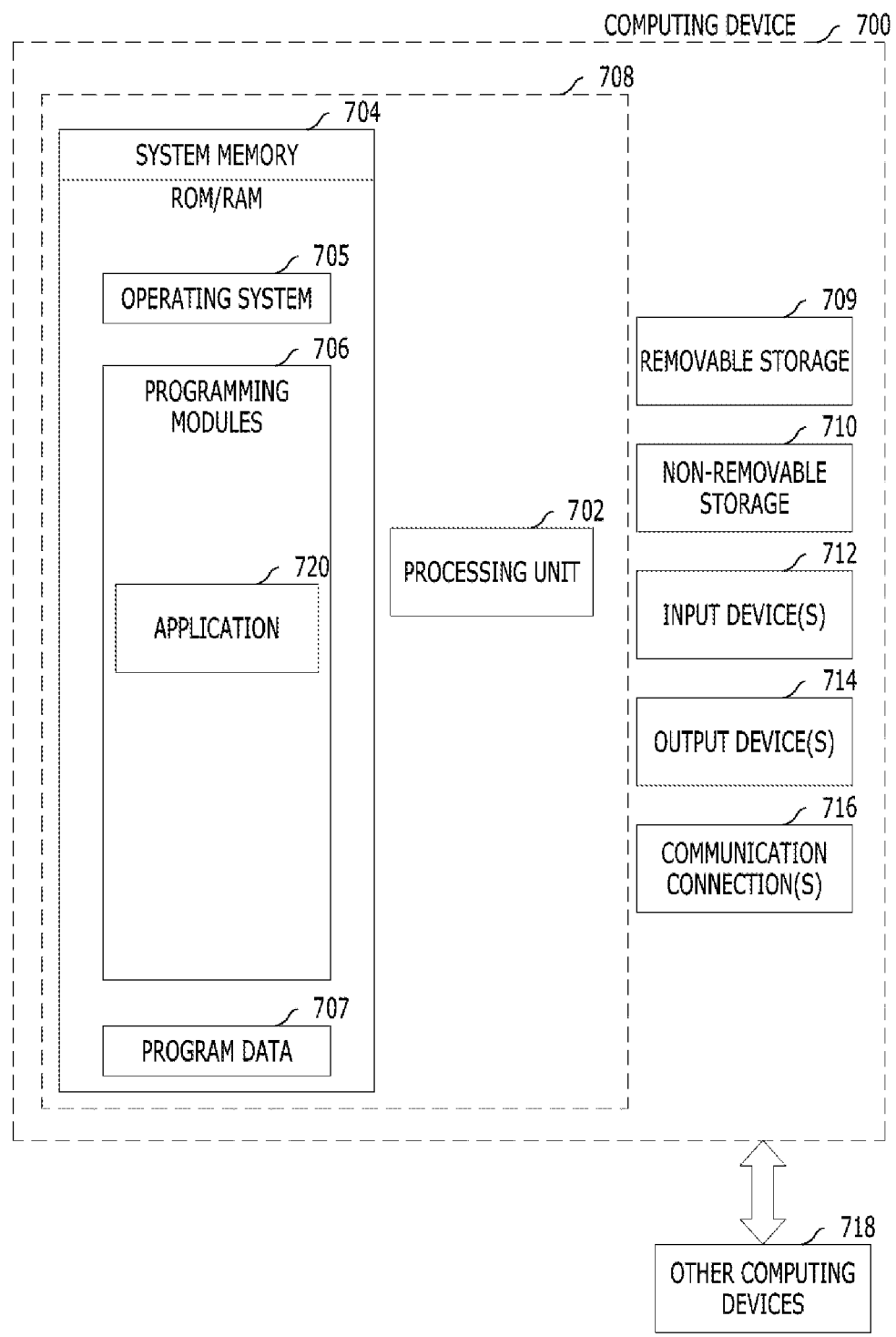
FIG. 7 is a block diagram illustrating an embodiment of an electronic control unit (ECU) embedded in a vehicle, in accordance with one or more embodiments.

FIG. 7 is a block diagram illustrating an embodiment of an electronic control unit (ECU) embedded in a vehicle, in accordance with one or more embodiments.

Consistent with embodiments of the disclosure, the aforementioned memory storage and processing unit are implemented in a computing device, such as computing device 700 of FIG. 7. In some embodiments, the computing device 700 is an ECU or a part of the ECU. Any suitable combination of hardware, software, or firmware is used to implement the memory storage and processing unit. In some embodiments, the memory storage and processing unit is implemented with computing device 700 or any of other computing devices 718, in combination with computing device 700. The aforementioned system, device, and processors are examples and other systems, devices, and processors comprise the aforementioned memory storage and processing unit, consistent with embodiments of the disclosure.

In some embodiments, the computing device 700 controls an operation of the vehicle based on the received navigation information. The computing device collects the sensing data during driving according to the received navigation information, and generates driving data based on the collected sensing data. The computing device transmits the generated driving data to the server. The computing device receives crowdsourcing data from the server, and then, updates the received navigation information based on the received crowdsourcing data. The computing device controls the operation of the vehicle, based on the updated navigation information.

With reference to FIG. 7, an ECU consistent with embodiments of the disclosure includes a computing device, such as computing device 700. In a basic configuration, computing device 700 includes at least one processing unit 702 and a system memory 704. system memory 704 comprise volatile (e.g. random access memory (RAM)), non-volatile (e.g. read-only memory (ROM)), flash memory, or any combination. System memory 704 includes operating system 705, one or more programming modules 706, and includes a program data 707. Operating system 705, in some embodiments, is suitable for controlling computing device 700's operation. In some embodiments, programming modules 706 includes application 720. Furthermore, embodiments of the disclosure is practiced in conjunction with a graphics library, other operating systems, or any other application program and is not limited to any particular application or system. This configuration is shown in FIG. 7.

In some embodiments, computing device 700 also includes additional data storage devices (removable and/or non-removable) such as, in some embodiments, magnetic disks, optical disks, or tape. Such additional storage is illustrated in FIG. 7 by a removable storage 709 and a non-removable storage 710. Computer storage media includes volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media includes, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which is used to store information and which is accessed by computing device 700. Computing device 700 has input device(s) 712 such as a keyboard, a mouse, a pen, a sound input device, a touch input device, etc. Output device(s) 714 such as a display, speakers, a printer, etc. is also included. The aforementioned devices are examples.

Computing device 700 also contains a communication connection 716 that allows computing device 700 to communicate with other computing devices 718, such as over a network in a distributed computing environment, in some embodiments, an intranet or the Internet. Communication connection 716 is one example of communication media. Communication media is embodied by computer readable instructions, data structures, program modules, or other data in a modulated data signal, such as a carrier wave or other transport mechanism, and includes any information delivery media. The term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media. The term computer readable media as used herein includes both storage media and communication media.

A number of program modules and data files is stored in system memory 704, including operating system 705. While executing on processing unit 702, programming modules 706 (e.g., application 720) performs processes including, in some embodiments, one or more of the methods as described above and illustrated in the figures. The aforementioned process is an example. Other programming modules that are used in accordance with embodiments of the present disclosure includes electronic mail and contacts applications, word processing applications, spreadsheet applications, database applications, slide presentation applications, drawing or computer-aided application programs, etc.

Figure 8:
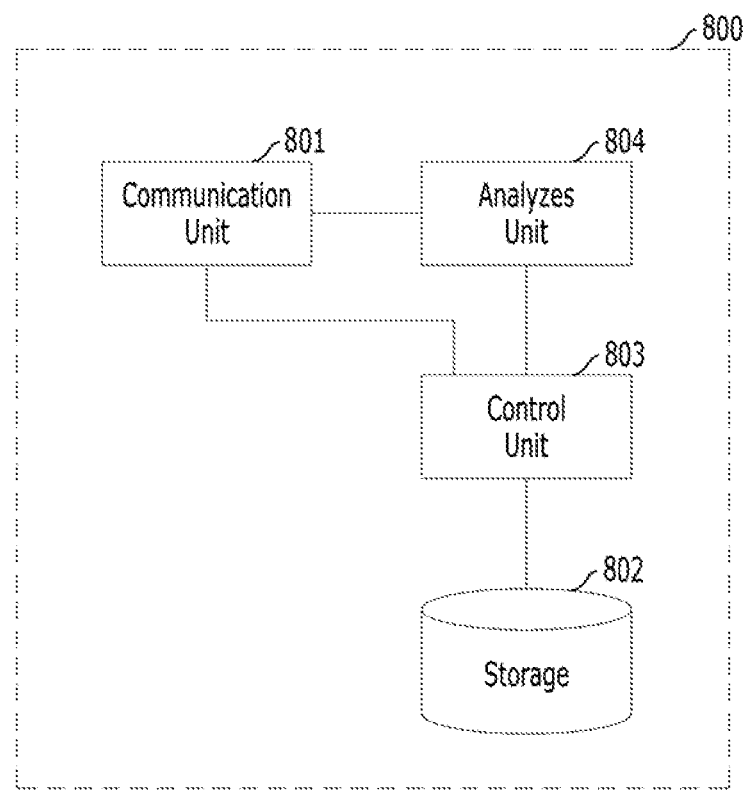
FIG. 8 is a block diagram illustrating an embodiment of a server, in accordance with one or more embodiments.

FIG. 8 is a block diagram illustrating an embodiment of a server, in accordance with one or more embodiments.

As shown in FIG. 8, the server 800 includes a communication unit 801, storage 802, a control unit 803, and an analysis unit 804. In some embodiments, the server 300 shown in FIG. 1 has the same configuration with the server 800 shown in FIG. 8.

The communication unit 801 receives a request for a route to a destination, from a vehicle. Further, the communication unit 801 transmits crowdsourcing data or navigation information to the vehicle.

The storage 802 stores route/navigation information.

The analysis unit 804 generates navigation information based on the stored route information in the storage 802. In some embodiments, the route information is map data. Further, the route information includes driving data collected by a plurality of vehicles.

In some embodiments, the control unit 803 retrieves navigation information, according to the received request from the vehicle. The control unit 803 transmits the retrieved navigation information to the vehicle, and receives collected data from a plurality of vehicles. Then, the control unit 803 combines the received collected data. The control unit 803 extracts a route-based data corresponding to the route of the vehicle, and generates the crowdsourcing data by using the extract route-based data. The control unit 803 transmits the generated crowdsourcing data to one or more vehicles.

In some implementations, a vehicle (101, 102 or 103 of FIG. 1) transmits or reports driving data to the server 800 (e.g., navigation server) over network (e.g., the internet). In some embodiments, vehicles connect to the network through cellular (or Wi-Fi) wireless node or wireless access point (201 or 202 of FIG. 2). In some implementations, the driving data collected from the vehicles is used to determine navigation information associated with steering wheel handling, accelerating and breaking.

In some implementations, the driving data is reported to the server 800 in real-time or near real-time. In some implementations, the driving data is stored on vehicles and reported to the server 800 at a later time. In some embodiments, vehicles are not connected to the network when the traffic information is collected. Thus, the vehicles stores the driving data to an internal storage device and report the driving data to the server 800 when the vehicles later establish a connection with the network.

Figure 9:
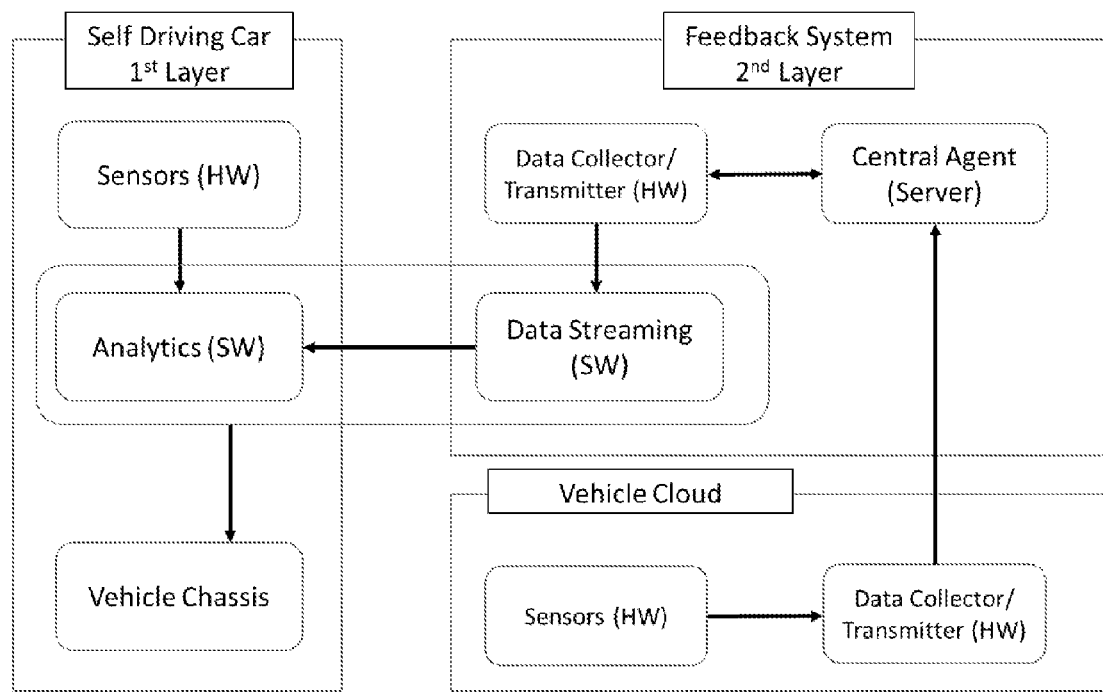
FIG. 9 is a block diagram illustrating a system for controlling a vehicle based on crowdsourcing data collected by vehicles, in accordance with one or more embodiments.

FIG. 9 is a block diagram illustrating a system for controlling a vehicle based on crowdsourcing data collected by vehicles, in accordance with one or more embodiments.

In $1^{st}$ layer, Self Driving Car corresponds to the vehicle 101, 102 or 103 of FIG. 1. Sensors correspond to the sensors 602 and 603 in FIG. 6, Analytics corresponds data stored in Hardware 605 in FIG. 6, and Vehicle Chassis correspond the MDPS which is aforementioned. In $2^{nd}$ layer, Central Agent corresponds to control unit 803 in FIG. 8, Data Collector/Transmitter corresponds to analyzes unit 804 in FIG. 8, and Data Streaming corresponds to communication unit 801 in FIG. 8. In Vehicle Cloud, sensors correspond to the sensors 602 and 603 in FIG. 6, and Data Collector/Transmitter corresponds to Hardware 605 in FIG. 6. The above disclosed correspondences are non-limiting embodiments.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

The terms "an embodiment", "embodiment", "embodiments", "the embodiment", "the embodiments", "one or more embodiments", "some embodiments", and "one embodiment" mean "one or more (but not all) embodiments of the present disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required; a variety of optional components are described to illustrate the wide variety of possible embodiments of the present disclosure.

Further, although process operations, method operations, algorithms or the like may be described in a sequential order, such processes, methods and algorithms may be configured to work in alternate orders. Any sequence or order of operations that may be described does not necessarily indicate a requirement that the operations be performed in that order. The operations of processes described herein may be performed in any order practical. Further, some operations may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present disclosure need not include the device itself.

The illustrated operations of FIGS. 2-4 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processor or by distributed processors.

The foregoing description of various embodiments of the disclosure has been presented for the purposes of illustration and description. It is not intended to be exhaustive or to limit the disclosure to the precise form disclosed. Many modifications and variations are possible in light of the above teaching. It is intended that the scope of the disclosure be limited not by this detailed description, but rather by the claims appended hereto. The above specification, examples and data provide a complete description of the manufacture and use of the composition of the disclosure. Since many embodiments of the disclosure can be made without departing from the spirit and scope of the disclosure, the disclosure resides in the claims hereinafter appended.

The invention claimed is:

1. A method for controlling a vehicle based on crowdsourcing data, the method comprising:
   transmitting, by the vehicle, a request to a server, the request comprises a route to a destination;
   retrieving, by the server, navigation information for the request, the navigation information is autonomous navigation information;
   transmitting, by the server, the retrieved navigation information to the vehicle;
   controlling, by the vehicle, an operation of the vehicle based on the transmitted navigation information;
   collecting, by the vehicle, vehicle driving data, during driving according to the transmitted navigation information;
   transmitting, by the vehicle, the collected data to the server;
   generating, by the server, crowdsourcing data based on the collected data transmitted from a plurality of vehicles;
   receiving, by the vehicle, the generated crowdsourcing data from the server;
   updating, by the vehicle, the transmitted navigation information based on the received crowdsourcing data; and
   controlling, by the vehicle, the operation of the vehicle based on the updated navigation information,
   wherein the updating the transmitted navigation information comprises:
      combining the received crowdsourcing data and the driving data; and
      updating the transmitted navigation information based on the combined data.

2. The method of claim 1, wherein the vehicle driving data comprises driving data comprising information on at least one of a steering rotation, accelerating and braking.

3. The method of claim 1, wherein the transmitting the request comprises:
   receiving, by the vehicle, an input from a driver for the destination.

4. The method of claim 1, wherein the transmitting the request comprises:
   determining, by the vehicle, the destination based on a travel log stored in the vehicle.

5. The method of claim 1, wherein the transmitting the collected data comprises:
   transmitting, by the vehicle, the collected data to the server in accordance with a predetermined cycle.

6. The method of claim 1, wherein the transmitting the collected data comprises:
   transmitting, by the vehicle, the collected data to the server when the vehicle detects an event during the driving to the destination.

7. The method of claim 1, wherein the collecting comprising:
   collecting the data, during driving to the destination, in accordance with a predetermined cycle.

8. The method of claim 1, wherein the collecting comprising:
   collecting the data, during driving to the destination, when the vehicle detects an event during the driving to the destination.

9. The method of claim 1, wherein the collecting comprising:
   transmitting, by the vehicle, the collected data to the server;
   receiving, by the server, the collected data from a plurality of vehicles;
   updating, by the server, the retrieved navigation information based on the received crowdsourcing data;
   re-transmitting, by the server, the updated navigation information to the vehicle; and
   applying, by the vehicle, the re-transmitted navigation information to control of the vehicle.

10. The method of claim 1, wherein the collecting comprising:
    generating, by the vehicle, sensing data by using a plurality of sensors of the vehicle;
    collecting, by a driving control unit of the vehicle, the generated sensing data;
    generating, by the driving control unit of the vehicle, the collected data based on the collected sensing data.

11. The method of claim 10, wherein at least one of the plurality of sensors detects a traffic light during driving of the vehicle, and a stop of the vehicle at a red light of the detected traffic light.

12. The method of claim 1, wherein the controlling the operation of the vehicle comprises:
    controlling at least one of a speed of the vehicle and a steering angle of the vehicle.

13. The method of claim 1, wherein the receiving the crowdsourcing data comprises:
    receiving, by the server, first collected data from a first vehicle;
    receiving, by the server, second collected data from a second vehicle;
    generating, by the server, the crowdsourcing data by overlapping the first collected data and the second collected data; and
    receiving, by the vehicle, the crowdsourcing data from the server.

14. The method of claim 1, further comprising:
    detecting, by the vehicle, a current location of the vehicle; and
    when an amount of the crowdsourcing data regarding the detected current location is lesser than a threshold amount, navigating the vehicle to a different location of which an amount of the crowdsourcing is greater than the threshold amount.

15. The method of claim 1, further comprising:
detecting, by the vehicle, a current location of the vehicle; and
when a distance between the detected current location and a location of which an amount of the crowdsourcing data is less than a threshold amount, is less than a threshold distance, outputting, by the vehicle, a notification.

16. The method of claim 1, further comprising:
when the vehicle detects a preset unusual event, changing a driving mode of the vehicle to a driver-control mode.

17. A method for controlling a vehicle based on crowdsourcing data, the method comprising:
transmitting, by the vehicle, a request to a server, the request comprises a route to a destination;
retrieving, by the server, navigation information for the request, the navigation information is autonomous navigation information;
transmitting, by the server, the retrieved navigation information to the vehicle;
controlling, by the vehicle, an operation of the vehicle based on the transmitted navigation information;
collecting, by the vehicle, vehicle driving data, during driving according to the transmitted navigation information;
transmitting, by the vehicle, the collected data to the server;
generating, by the server, crowdsourcing data based on the collected data transmitted from a plurality of vehicles;
receiving, by the vehicle, the generated crowdsourcing data from the server;
updating, by the vehicle, the transmitted navigation information based on the received crowdsourcing data; and
controlling, by the vehicle, the operation of the vehicle based on the updated navigation information,
wherein the receiving the crowdsourcing data comprises:
receiving, by the server, first collected data from a first vehicle;
receiving, by the server, second collected data from a second vehicle;
generating, by the server, the crowdsourcing data by overlapping the first collected data and the second collected data; and
receiving, by the vehicle, the crowdsourcing data from the server,
wherein the collected data includes information regarding a driving section in which the collected data is generated, and
wherein the generating the crowdsourcing data comprises:
determining an overlapped section which is a part of the route to the destination and is included in each of the driving section of the first collected data and the driving section of the second collected data;
extracting third collected data regarding the overlapped section, from the first collected data;
extracting fourth collected data regarding the overlapped section, from the second collected data; and
generating the crowdsourcing data by combining the third and fourth collected data.

18. A vehicle, comprising:
a communication unit configured to
transmit a request for a route to a destination to a server, and
receive navigation information retrieved according to the request from the server;
a sensor configured to generate sending data; and
a control unit configured to
control an operation of the vehicle based on the received navigation information,
collect, by the sensor, the sensing data during driving according to the received navigation information,
generate driving data based on the collected sensor data,
transmit the generated driving data to the server,
receive crowdsourcing data from the server,
update the received navigation information based on the received crowdsourcing data, and
control the operation of the vehicle based on the updated navigation information,
wherein the control unit is further configured to update the transmitted navigation information by combining the received crowdsourcing data and the driving data, and updating the transmitted navigation information based on the combined data.

* * * * *